United States Patent [19]

Heilbrunn

[11] Patent Number: 4,762,877
[45] Date of Patent: Aug. 9, 1988

[54] POLYOLEFINIC ELASTOMER COMPOSITIONS, PRODUCTION PROCESS AND ARTICLES OBTAINED FROM SAID COMPOSITIONS

[75] Inventor: Alain Heilbrunn, Paris, France

[73] Assignee: Societe Chimique Des Charbonnages S.A., France

[21] Appl. No.: 905,342

[22] PCT Filed: Dec. 12, 1985

[86] PCT No.: PCT/FR85/00362

§ 371 Date: Aug. 13, 1986

§ 102(e) Date: Aug. 13, 1986

[87] PCT Pub. No.: WO86/03761

PCT Pub. Date: Jul. 3, 1986

[30] Foreign Application Priority Data

Dec. 14, 1984 [FR] France ............................ 8419113

[51] Int. Cl.$^4$ ............................ C08J 3/24; C08K 3/22
[52] U.S. Cl. ............................ 524/432; 524/445; 524/517; 525/194; 525/195; 525/207
[58] Field of Search ............................ 525/194, 207, 195; 524/432, 435, 517

[56] References Cited

U.S. PATENT DOCUMENTS

| | | | |
|---|---|---|---|
| 3,451,962 | 6/1969 | Auler et al. ............... | 525/194 |
| 3,454,676 | 7/1969 | Busse . | |
| 3,557,028 | 1/1971 | Turk ............................ | 525/194 |
| 3,821,134 | 6/1974 | Son et al. ..................... | 525/194 |
| 3,852,354 | 12/1974 | Usamoto et al. ............ | 525/194 |
| 3,873,494 | 3/1975 | Lewis .......................... | 525/207 |
| 3,968,065 | 7/1976 | Morris et al. ............... | 525/194 |
| 4,431,775 | 2/1984 | Maeda et al. ............... | 525/194 |

FOREIGN PATENT DOCUMENTS

| | | | |
|---|---|---|---|
| 59-126447 | 7/1984 | Japan ........................... | 525/207 |
| 83/00489 | 2/1983 | PCT Int'l Appl. ........... | 525/194 |
| 1192339 | 5/1970 | United Kingdom .......... | 525/194 |

Primary Examiner—John C. Bleutge
Assistant Examiner—Robert E. L. Sellers, II
Attorney, Agent, or Firm—Finnegan, Henderson, Farabow, Garrett & Dunner

[57] ABSTRACT

The compositions according to the invention comprise at least one unsaturated polyolefin elastomer, at least one vulcanizing agent and at least one vulcanization activator for the said elastomer, and in addition at least one terpolymer (A) comprising repeat units derived from ethylene, repeat units derived from maleic anhydride and repeat units derived from at least one ester of acrylic or methacrylic acid.

For their manufacture, the unsaturated polyolefin elastomer, the vulcanizing agent, the vulcanization activator and the terpolymer are mixed at a temperature of between 70° C. and 150° C. for a sufficient time to produce homogenization of the mixture.

Application to the production of articles such as seals, flexible connection pipings, belts, and the like.

11 Claims, No Drawings

POLYOLEFINIC ELASTOMER COMPOSITIONS, PRODUCTION PROCESS AND ARTICLES OBTAINED FROM SAID COMPOSITIONS

The present invention relates to compositions based on a polyolefin elastomer, a process for their manufacture and articles produced by converting the said compositions.

Polyolefin elastomers, especially random ethylene/propylene/diene polymers, are rubbers which are very widely employed in industry. In order to convert them using extrusion and moulding techniques, it is necessary to have available compositions of very high hardness. Such compositions must nevertheless retain an elastomeric behaviour and not assume that of a thermoplastic. Consequently, the compositions must not only be crosslinkable but must also have good processability, that is to say be capable of being converted using rubber conversion methods and on machines used in this field; in particular, it is essential that the conversion temperature does not exceed 110° C. after crosslinking agents have been incorporated.

The addition of conventional reinforcing agents, such as carbon black, clay or silica, to the polyolefin elastomers does not per se make it possible to attain a hardness which is satisfactory in this respect.

Furthermore, it is known to add styrene resins (French Patent No. 1,337,598) or phenolic agents (German Patent No. 2,324,987) to polyolefin elastomers in order to increase their hardness. However, such compositions are not wholly satisfactory, since their elastic recovery after deformation at 20° C. is not very good and, above all, since they are characterized by a very high dimensional instability in use.

French Patent No. 1,491,940 discloses a mixture intended for the manufacture of golf balls, comprising from 5 to 95% by weight of a synthetic rubber chosen from polybutadiene, polychloroprene, polyisoprene, acrylonitrile/butadiene/styrene polymers, styrene/butadiene/styrene block copolymers and ethylene/propylene copolymers and from 95 to 5% by weight of a copolymer of an olefin and an unsaturated carboxylic acid. U.S. Pat. No. 3,454,676 also discloses a mixture consisting of 20 to 80% by weight of an ethylene/propylene/1,4-hexadiene elastomer and of 80 to 20% by weight of an ethylene-based ionic copolymer containing from 1 to 25% on a molar basis of repeat units derived from an ethylenically α,β-unsaturated mono- or dicarboxylic acid, in which at least 30% of the acid groups are neutralized with metal ions. In the absence of a filler such as carbon black and in the absence of a vulcanizing agent such as sulphur, this last mixture has a relatively mediocre break strength of between 22 and 100 kg/cm$^2$.

An aim of the present invention is therefore to provide compositions based on an unsaturated polyolefin elastomer which, while having a Shore A hardness of at least 80, have an excellent dimensional stability in use, good adhesion to metals such as steel and a satisfactory degree of Zwick rebound.

The compositions forming the first subject of the present invention comprise at least one unsaturated polyolefin elastomer, at least one vulcanizing agent and at least one vulcanization activator for the said elastomer, and are characterized in that they additionally comprise at least one terpolymer (A) containing repeat units derived from ethylene, repeat units derived from maleic anhydride and repeat units derived from at least one ester of acrylic or methacrylic acid.

Within the meaning of the present invention, an unsaturated polyolefin elastomer is preferably understood to mean a terpolymer (B) of ethylene with at least one α-olefin containing from 3 to 6 carbon atoms and at least one diene. Ethylene/propylene terpolymers are more especially preferred, the diene being chosen from conjugated or unconjugated linear or cyclic dienes such as, for example, butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-(5-hexenyl)-2-norbornene, 1,5-cyclooctadiene, bicyclo[2.2.2]octa-2,5-diene, cyclopentadiene, 4,7,8,9-tetrahydroindene and isopropylidenetetrahydroindene. Such elastomer terpolymers (B) which can be used according to the present invention generally comprise between 15% and 60% on a molar basis of repeat units derived from propylene and between 0.1% and 20% on a molar basis of repeat units derived from the diene.

Within the meaning of the present invention, a vulcanizing agent for the elastomer is understood to mean especially sulphur and organic sulphur derivatives.

The vulcanization activator, within the meaning of the present invention, is understood to mean compounds used in combination with the vulcanizing agent such as, in particular, zinc and tellurium dithiocarbamates, alkyl benzothiazylsulphonamides and alkylthiuram sulphides.

Among the terpolymers (A) additionally forming part of the compositions according to the invention, preference is given to terpolymers comprising:
  from 87 to 98.7% on a molar basis of repeat units derived from ethylene,
  from 1 to 10% on a molar basis of repeat units derived from an ester chosen from alkyl acrylates and methacrylates, the said alkyl group containing from 1 to 6 carbon atoms, and
  from 0.3 to 3% on a molar basis of repeat units derived from maleic anhydride,
and having a melt index (measured in accordance with the ASTM standard D-1238) of between 3 and 200 dg/min. Such polymers have been described in French Patent No. 2,498,609. They are used in a quantity of between 15% and 60% by weight relative to the weight of the polymer phase, the latter consisting of the mixture of unsaturated polyolefin elastomer and of the terpolymer (A).

The proportion of the terpolymer (A) in the polymer phase will be chosen, depending on the use for which the composition is intended, as a function of the required compromise between:
  on the one hand, the Shore hardness, the Zwick rebound and adhesion to metals, the values of all these properties being proportionately higher the higher the proportion of the terpolymer (A), and
  on the other hand, the tensile properties (strength and elongation at break, residual compression set) the values of which decrease when the proportion of the terpolymer (A) increases.

The compositions according to the invention may additionally comprise at least one reinforcing filler such as, in particular, carbon black, clay or silica, in a quantity which is preferably between 10% and 120% by weight based on the weight of the polymer phase. The compositions according to the invention may additionally comprise at least one organic pigment and/or at least one inorganic filler in a quantity which preferably does not exceed 5% by weight based on the weight of the polymer phase. Such inorganic fillers comprise, in particular, titanium, lead, iron, tin and zinc oxides, barium and lead sulphates, magnesium, calcium and lead carbonates, pyrites, and the like.

The compositions according to the invention may additionally comprise at least one reinforcing synthetic resin such as a particular a butadiene/styrene resin in a quantity not exceeding 25% by weight based on the weight of the polymer phase as defined above.

The compositions according to the invention may additionally comprise at least one plasticizer for the unsaturated polyolefin elastomer, in a quantity not exceeding 30% by weight based on the weight of the polymer phase.

A second subject of the present invention consists of a process for the manufacture of the compositions described above, characterized in that the unsaturated polyolefin elastomer, the vulcanizing agent, the vulcanization activator and the terpolymer are mixed at a temperature of between 70° C. and 150° C. for a sufficient time to produce homogenization of the mixture, that is to say generally between 2 and 10 minutes, depending on the means employed. The remaining components which are present in the composition if desired, namely the reinforcing filler, the organic pigment, the inorganic filler, the reinforcing synthetic resin, and the plasticizer for the elastomer, may be mixed under the same conditions. Any suitable device for mixing elastomer compositions, such as especially an internal roll or rotor mixer, may be used to implement the process according to the invention.

The compositions obtained at this stage, that is to say without their temperature having exceeded 150° C., are suitable for storage and transport. However, in order to convert them into industrial articles, they will need to be vulcanized by being subjected, for a period of preferably between 3 and 40 minutes, to a temperature which is preferably between 160° and 200° C., the shaping of the said industrial articles taking place beforehand or simultaneously with this vulcanization phase.

The vulcanized compositions obtained according to the present invention have satisfactory characteristics in respect of the following:
Shore A hardness of at least 80,
tensile properties (break strength and elongation) before and after aging,
elastic behaviour after compression (residual compression set),
dimensional stability (high-temperature shrinkage), and
adhesion to metals.

This set of advantageous characteristics makes it possible to convert the compositions according to the invention into industrial articles which have a variety of uses, such as, especially, seals for car (windscreen) and domestic appliance (refrigerator doors) industries, flexible connection pipings, belts, and the like. Such articles are obtained by usng conversion methods which are well known to the person skilled in the art, such as extruded profile manufacture, compression moulding, and the like.

The examples below are given by way of illustration, without limiting the present invention.

Examples 1 and 2

An internal roll mixer is used, by mixing at a temperature of 110° C., to prepare a homogeneous composition from the ingredients listed in Table I below, the quantities of these ingredients being expressed in parts by weight.

The elastomer (a) is an ethylene/propylene/5-ethylidene-2-norbornene terpolymer marketed by the Esso company under the trade mark Vistalon MD 83/1.

The terpolymer (c) is an ethylene/ethyl acrylate/maleic anhydride terpolymer with a melt index (measured according to the ASTM standard D-1238) of 7 dg/min, containing 6% by weight of ethyl acrylate and 3% by weight of maleic anhydride, marketed by the Applicant Company under the trade mark Lotader LX 4110.

The terpolymer (d) is an ethylene/ethyl acrylate/maleic anhydride terpolymer with a melt index (measured according to ASTM standard D-1238) of 100 dg/min, containing 18% by weight of ethyl acrylate and 4% by weight of maleic anhydride, marketed by the Applicant Company under the trade mark Lotader CR 6/15.

The plasticizer (e) is a product marketed under the trade mark Flexon 876. The vulcanization activator (f) is zinc ethylphenyldithiocarbamate. The vulcanization activator (g) is cyclohexyl benzothiazylsulphonamide. The vulcanization activator (h) is tetramethylthiuram disulphide. The vulcanization activator (i) is tellurium diethyldithiocarbamate.

The compositions prepared in this manner are then vulcanized in a press at 180° C. for 10 minutes. The following are measured on the compositions obtained in this manner:
initial Shore A hardness $H_0$ at 200° C., in accordance with the ASTM standard D 2240,
the initial break strength $BS_0$ in accordance with the ASTM standard D-638, expressed in kg/cm$^2$, the initial elongation at break $EB_0$, in accordance with the ASTM standard D-638, expressed as a percentage,
the Shore A hardness (denoted $H_1$) and the break strength $BS_1$, expressed in accordance with the same standards and measured after 7 days' accelerated aging at 100° C. in air in an oven with air replenishment, according to the NFT standard 46.004,
the Shore A hardness (denoted $H_2$) and the break strength $BS_2$ expressed in accordance with the same standards and measured after 7 days accelerated aging in water at 100° C.,
the residual cold compression set $RCS_{20}$, in accordance with the ASTM standard D-395 (method B), measured after a 10% compression at 20° C.,
the residual hot compression set $RCS_{70}$, in accordance with the same standard, measured after a 25% compression at 70° C.,
the dimensional stability DS, expressed as the change in length (in per cent) after 30 minutes at 170° C., of a bar 10×10×200 mm in size, cut out of a plaque vulcanized for 10 minutes at 180° C.,
the Zwick rebound ZR at −30° C., measured in accordance with the ISO standard 4662, and expressed as a percentage.

The numerical results of these various measurements are shown in Table II below.

EXAMPLES 3 and 4

An internal roll mixer is used to prepare, by mixing at a temperature which is gradually raised from 80° C. to 130° C. (150° C. in the case of Example 3), a homogeneous composition from the ingredients listed in Table I below, the quantities of these ingredients being expressed in parts by weight.

The elastomer (b) is an ethylene/propylene/5-ethylidene-2-norbornene terpolymer marketed by the Esso company under the trade mark Vistalon 7000.

The resin (j) is a butadiene/styrene resin marketed by the Shell Chimie company under the trade mark Cariflex SP 145. The resin (k) is a novolac resin containing added hexamethylenetetramine and marketed by the Rousselot company under the name R 7551.

The compositions are then vulcanized in a press at 180° C. for 10 minutes. The same properties as before are measured on the compositions obtained in this manner. The numerical results of these measurements are shown in Table II below.

TABLE I

| Example | 1 | 2 | 3 | 4 |
|---|---|---|---|---|
| Elastomer (a) | 90 | 60 | 0 | 80 |
| Elastomer (b) | 0 | 0 | 80 | 0 |
| Terpolymer (c) | 10 | 40 | 0 | 30 |
| Terpolymer (d) | 7.5 | 30 | 20 | 0 |
| ZnO | 5 | 5 | 5 | 5 |
| Stearic acid | 1 | 1 | 1 | 1 |
| Carbon black | 100 | 100 | 100 | 100 |
| Plasticizer (e) | 22.5 | 0 | 0 | 0 |
| Activator (f) | 2 | 2 | 2 | 2 |
| Activator (g) | 1.5 | 1.5 | 1.5 | 1.5 |
| Activator (h) | 0.4 | 0.4 | 0.4 | 0.4 |
| Activator (i) | 0.4 | 0.4 | 0.4 | 0.4 |
| Sulphur | 1.5 | 1.5 | 1.5 | 1.5 |
| Resin (j) | 0 | 0 | 20 | 0 |
| Resin (k) | 0 | 0 | 0 | 15 |

TABLE II

| Example | 1 | 2 | 3 | 4 |
|---|---|---|---|---|
| $H_0$ | 80 | 95 | 97 | 97 |
| $BS_0$ | 137 | 150 | 136 | 138 |
| $EB_0$ | 230 | 165 | 250 | 190 |
| $H_1$ | 85 | 95 | 98 | 97 |
| $BS_1$ | 139 | 195 | 149 | 150 |
| $H_2$ | 81 | 95 | 97 | |
| $BS_2$ | 152 | 181 | 145 | |
| $RCS_{20}$ | 18 | 40 | 71 | 36 |
| $RCS_{70}$ | 30 | 53 | 46 | 44 |
| DS | 0 | 0 | 0.17 | 0.25 |
| ZR | 15 | 27.5 | 34 | 27 |

I claim:

1. A polyolefinic elastomer composition comprising:
   (a) at least one terpolymer (A) containing repeat units derived from ethylene, repeat units derived from maleic anhydride, and repeat units derived from at least one ester of acrylic or methacrylic acid;
   (b) at least one unsaturated polyolefin elastomer comprising a terpolymer (B) of ethylene with at least one alpha-olefin containing from 3 to 6 carbon atoms and at least one diene;
   (c) at least one sulfur containing vulcanizing agent;
   (d) at least one vulcanization activator for the elastomer selected from the group consisting of zinc dithiocarbamates, tellurium dithiocarbamates, alkyl benzothiazylsulphonamides, and alkylthiuram sulfides; and
   (e) a reinforcing filler, the composition having a Shore hardness of at least 80.

2. The composition of claim 1, wherein the reinforcing filler is selected from the group consisting of carbon black, clay, and silica.

3. Compositions according to claim 1, characterized in that the terpolymer (A) comprises:
   from 87 to 98.7% on a molar basis of repeat units derived from ethylene,
   from 1 to 10% on a molar basis of repeat units derived from an ester chosen from alkyl acrylates and methacrylates, the said alkyl group containing from 1 to 6 carbon atoms, and
   from 0.3 to 3% on a molar basis of repeat units derived from maleic anhydride, and has a melt index of between 3 and 200 dg/min.

4. Compositions according to claim 1, characterized in that the reinforcing filler is carbon black.

5. Compositions according to claim 1, characterized in that the reinforcing filler is present in a quantity of between 10 and 120% by weight based on the weight of the polymer phase.

6. Compositions according to claim 1 characterized in that they further comprise at least one organic pigment and/or an inorganic filler in addition to said reinforcing filler.

7. Compositions according to claim 6, characterized in that the said inorganic filler is zinc oxide.

8. Compositions according to either of claims 6 or 7, characterized in that the said organic pigment and/or the said inorganic filler is present in a quantity not exceeding 5% by weight based on the weight of the polymer phase.

9. Compositions according to claim 1, characterized in that they additionally comprise at least one plasticizer for the unsaturated polyolefin elastomer.

10. Compositions according to claim 9, characterized in that the said plasticizer is present in a quantity not exceeding 30% by weight based on the weight of the polymer phase.

11. Articles obtained by vulcanizing and shaping compositions according to claim 1.

* * * * *